United States Patent [19]
Morikawa

[11] Patent Number: 5,085,193
[45] Date of Patent: Feb. 4, 1992

[54] FUEL INJECTION CONTROL SYSTEM FOR A TWO-CYCLE ENGINE

[75] Inventor: Koji Morikawa, Musashino, Japan

[73] Assignee: Fuji Jukogyo Kabushiki Kaisha, Tokyo, Japan

[21] Appl. No.: 528,576

[22] Filed: May 23, 1990

[30] Foreign Application Priority Data

May 30, 1989 [JP] Japan ................................ 1-137759

[51] Int. Cl.⁵ .............................................. F02M 41/00
[52] U.S. Cl. .................................... 123/458; 123/497; 123/73 C
[58] Field of Search ................ 123/458, 497, 498, 499

[56] References Cited

U.S. PATENT DOCUMENTS

| | | | |
|---|---|---|---|
| 3,844,263 | 10/1974 | Endo | 123/458 |
| 3,949,713 | 4/1976 | Rivere | 123/458 |
| 4,248,194 | 2/1981 | Drutchas | 123/497 |
| 4,404,944 | 9/1983 | Yamazaki | 123/458 |
| 4,481,926 | 11/1984 | Miki | 123/458 |
| 4,777,921 | 10/1988 | Miyaki | 123/458 |
| 4,800,859 | 1/1989 | Sagisaka | 123/497 |
| 4,907,549 | 3/1990 | Morikawa | 123/65 BA |
| 4,920,942 | 5/1990 | Fujimori | 123/497 |
| 4,957,089 | 9/1990 | Morikawa | 123/73 C |

FOREIGN PATENT DOCUMENTS 58-143136 8/1983 Japan.
59-122734 7/1984 Japan.

Primary Examiner—Carl Stuart Miller
Attorney, Agent, or Firm—Martin A. Farber

[57] ABSTRACT

A solenoid operated valve controls the pressure of fuel supplied to a fuel injector. The fuel pressure is determined in accordance with the engine operating conditions. A driver is provided for operating the solenoid operated valve for setting the fuel pressure. The fuel pressure is increased as the load on the engine increases.

4 Claims, 7 Drawing Sheets

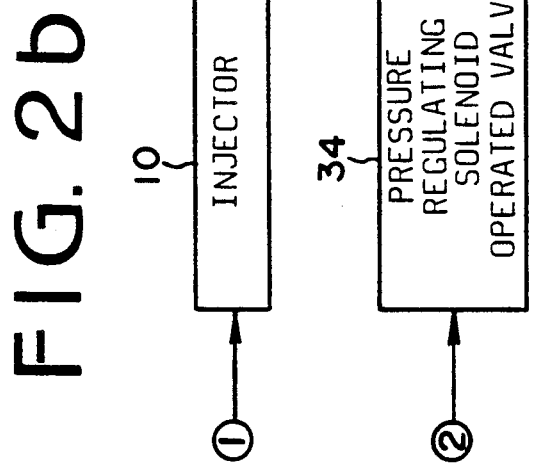

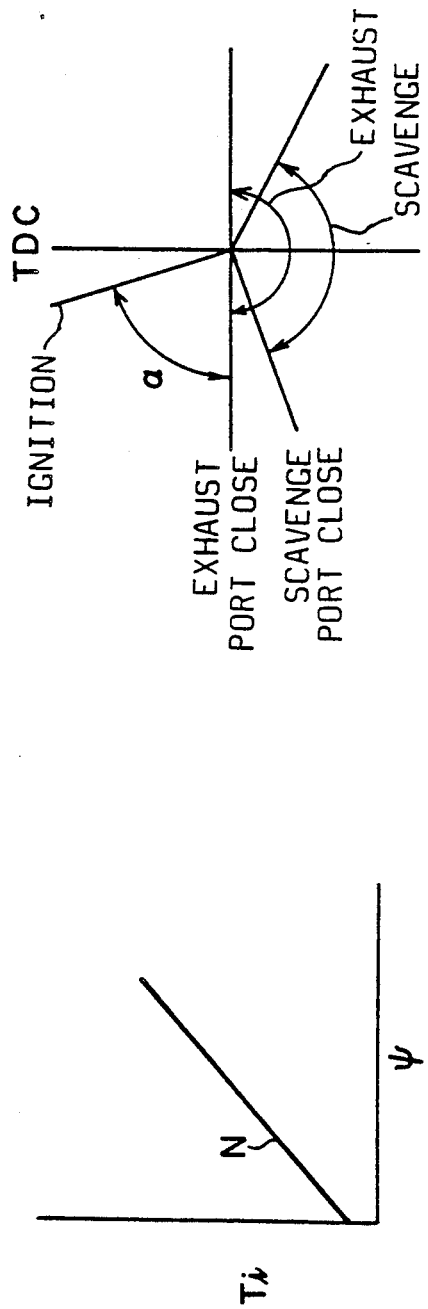

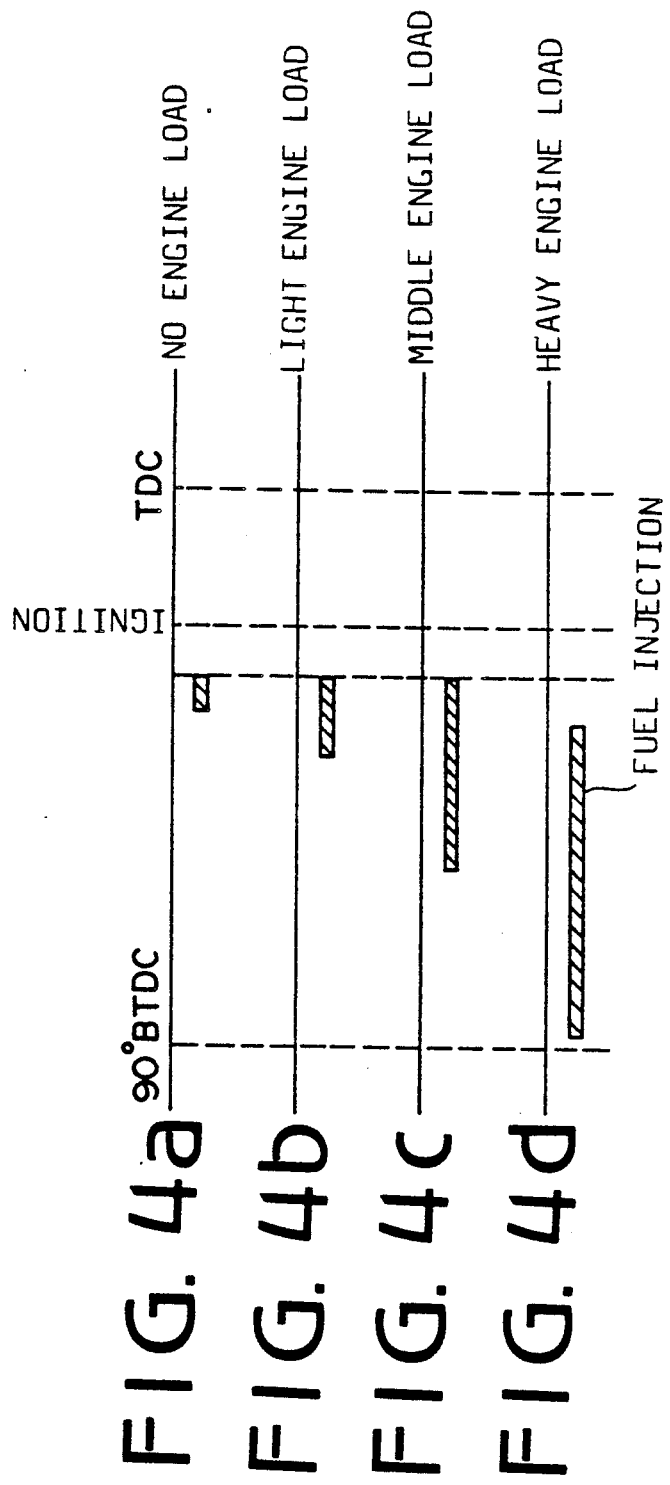

FUEL INJECTION CONTROL SYSTEM FOR A TWO-CYCLE ENGINE

BACKGROUND OF THE INVENTION

The present invention relates to a system for controlling injection of fuel for a two-cycle engine with a direct fuel injection system where only fuel is injected into a combustion chamber, and more particularly to a system for controlling fuel injection pulse width, injection timing and fuel pressure in accordance with operating conditions of the engine.

There are various methods for supplying the fuel to a two-cycle engine. In one method where the fuel is mixed with air to make a combustible mixture and the mixture is supplied to a cylinder of the engine, a part of the fuel escapes from the cylinder through an exhaust port when scavenging the mixture. In order to prevent the fuel from escaping through the exhaust port, a method in which only the air is delivered to the cylinder and the fuel is injected directly into the cylinder by an injector has been proposed.

Such a direct fuel injection system may be of a type where only high pressurized fuel is injected or a type where low pressurized fuel mixed with air is injected. In order to provide stratified charging, it is preferable to inject only the fuel at high pressure, since the fuel can be injected in a short time and the injection timing can be set near the ignition timing, thereby restraining diffusion of the fuel. Moreover, it is necessary to control the high pressure in relation to the fuel injection quantity and the injection timing, in accordance with engine operating conditions.

Japanese Patent Application Laid-Open 58-143136 discloses a fuel injection control system where fuel pressure is decreased in a light engine load range. As a result, a fuel injection pulse width can be maintained at a length whereby stability of a fuel injection is ensured while decreasing the quantity of the fuel.

Japanese Patent Application laid-Open 59-122734 discloses a fuel injection control system where the fuel pressure is controlled in accordance with engine speed and intake pressure, thereby decreasing the dynamic range of the injector compared to an ordinary system.

However, these fuel injection systems are only for a four-cycle engine and hence the fuel is injected at a low pressure unlike the direct fuel injection system for the two-cycle engine. In particular, the fuel pressure is controlled at a pressure higher than the intake pressure by a predetermined value, and the injection timing is relatively roughly set at a timing before or during an induction stroke. On the other hand, the fuel in the direct fuel injection system for the two-cycle engine must be injected at a high pressure, and the injection timing must be determined in dependency on a closing timing of a scavenge port. Thus, the above-described injection systems cannot be used for the two-cycle engines.

SUMMARY OF THE INVENTION

The object of the present invention is to provide a direct fuel injection control system for a two-cycle engine in which timing and duration of fuel injection are controlled in accordance with engine operating conditions so as to improve fuel consumption, emission control, efficiency and combustion stability of the engine.

According to the present invention, there is provided a system for controlling the fuel injection for a two-cycle engine having at least one cylinder, a scavenge port, an exhaust port, an intake passage communicated with said scavenge port, a fuel injector provided to inject the fuel directly into the cylinder, and a fuel pump for supplying the fuel to the fuel injector.

The system, comprises a solenoid operated valve for controlling the pressure of the fuel supplied to the fuel injector, detector means for detecting engine speed and load on the engine and for producing an operating condition signal, injection fuel quantity determining means responsive to the operating condition signal for determining the quantity of the fuel injected by the fuel injector, fuel pressure determining means responsive to the operating condition signal for determining the pressure of the injected fuel, timing determining means responsive to the operating condition signal for determining the timing for injecting the fuel, first driving means for operating the solenoid operated valve for setting the fuel pressure in accordance with the determined pressure and second driving means for operating the fuel injector to inject the fuel by the determined quantity at the determined timing.

In an aspect of the invention, the fuel pressure is determined so as to increase as the load increases, and the injection timing is determined so as to advance as the load increases.

The fuel pressure determining means comprises a desired fuel pressure look-up table, a desired fuel pressure providing section which derives a desired fuel pressure from the desired fuel pressure look-up table in accordance with engine operating conditions, a fuel pressure sensor for detecting fuel pressure, a comparator for comparing the detected fuel pressure with a derived desired fuel pressure for producing a difference and the first driving means being provided for operating the solenoid operated valve in accordance with the difference.

These and other objects and features of this invention will become understood from the following description with reference to the accompanying drawings.

BRIEF DESCRIPTION OF THE DRAWINGS

FIGS. 2a and 2b show a block diagram showing a control unit according to the present invention;

FIG. 3a is a graph showing fuel injection pulse width with respect to accelerator pedal depressing degree and engine speed;

FIG. 3b is a diagram showing fuel injection timing;

FIGS. 4a to 4d are diagrams showing fuel injection timings in various engine load ranges;

DETAILED DESCRIPTION OF THE PREFERRED EMBODIMENTS

Figure 1A:
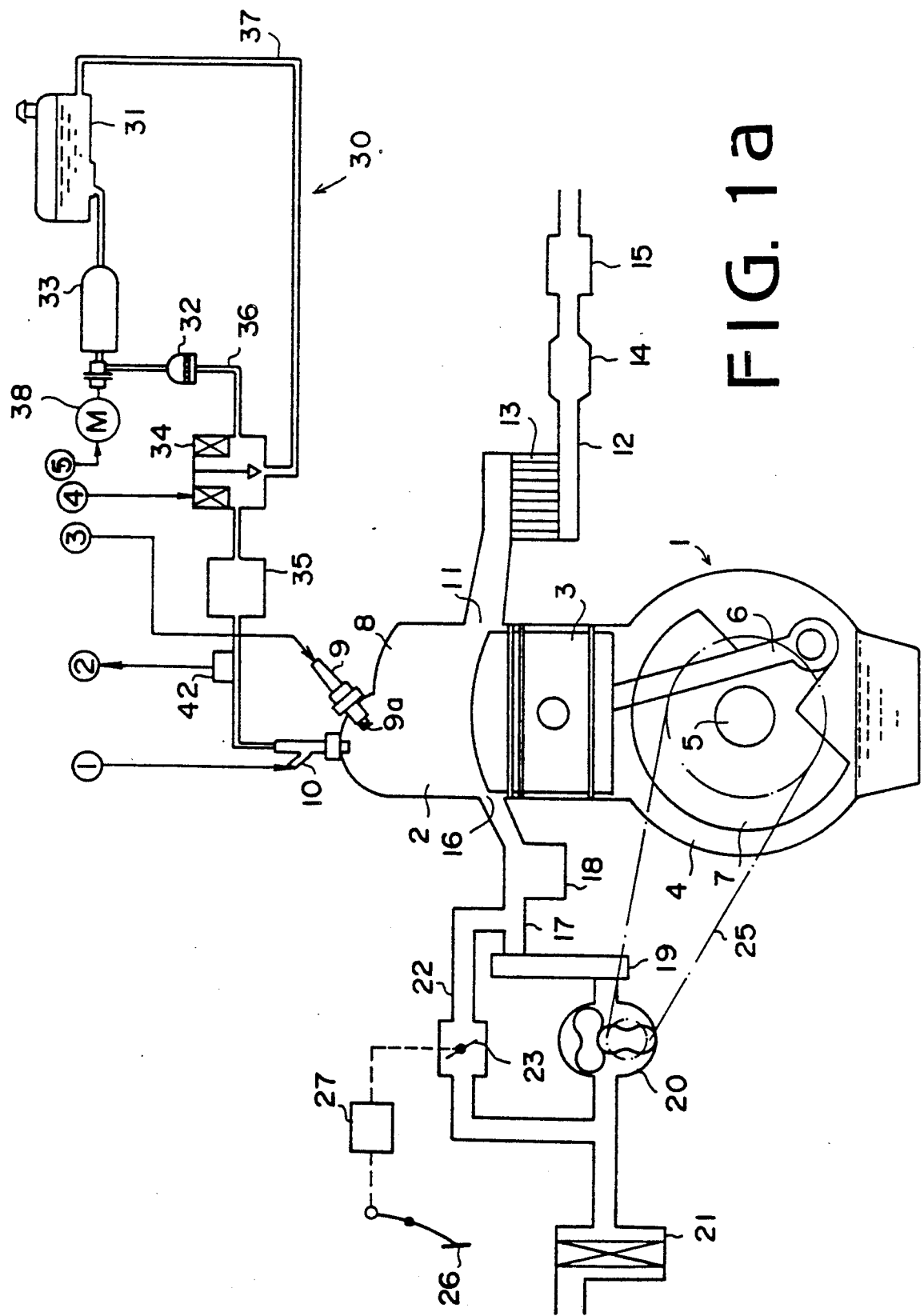
FIGS. 1a and 1b show a schematic diagram of a two-cycle engine of the present invention.
Figure 1B:
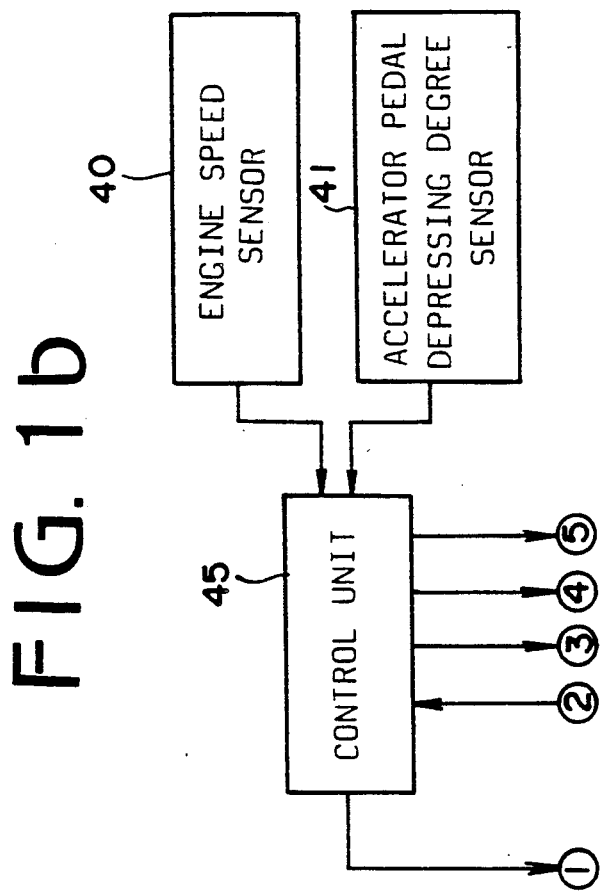

Referring to FIGS. 1a and 1b, a two-cycle engine 1, for a motor vehicle comprises a cylinder 2, a piston 3 reciprocating in the cylinder 2, a connecting rod 6 connected with the piston 3 and a crankshaft 5 disposed in a crankcase 4. A counterweight 7 is mounted on the crankshaft 5 so as to reduce the inertia of the piston 3 reciprocating in the cylinder 2.

In a wall of the cylinder 2, an exhaust port 11 and a scavenge port 16 are formed in 90 degrees angular disposition or opposing one another. The ports 11 and 16 are adapted to open at a predetermined timing with respect to the position of the piston 3.

A fuel injector 10 and a spark plug 9 are provided on a top of a combustion chamber 8 of the cylinder 2. The spark plug 9 is so inclined as to position a plug gap 9a thereof directly under the injector 10. The combustion chamber 8 may be of an offset, wedge or hemispheric type. The injector 10 is of a type where a predetermined amount of fuel is injected through a fuel injection system 30. Fuel in a fuel tank 31 is supplied to the injector 10 through a fuel passage 36 having a filter 32, a high pressure pump 33 driven by a motor 38, a pressure regulating solenoid operated valve 34 and an accumulator 35. The fuel returns to the tank 31 through a return passage 37. The pump 33 may be driven through the crankshaft 5.

The engine 1 is supplied with air through an air cleaner 21, a displacement scavenge pump 20, an intercooler 19 for cooling scavenge air and an intake passage 17 having a scavenge chamber 18 for absorbing scavenge pressure waves when the scavenge port 16 is opened or closed. A bypass 22 is provided around the scavenge pump 20 and the intercooler 19. The bypass 22 is provided with a control valve 23. Exhaust gas of the engine 1 is discharged through the exhaust port 11, an exhaust pipe 12 having a catalytic converter 13, an exhaust chamber 14 and a muffler 15.

The scavenge pump 20 is operatively connected to the crankshaft 5 through a transmitting device 25 comprising an endless belt running over a crank pulley and a pump pulley. The scavenge pump 20 is driven by the crankshaft 5 through the transmitting device 25 for producing a scavenge pressure. An accelerator pedal 26 is operatively connected with the control valve 23 through a valve controller 27. The opening degree of the control valve 23 is controlled by the controller 27 so as to be inversely proportional to the depressing degree of the accelerator pedal 26. Further, an engine speed sensor 40 and an accelerator pedal depressing degree sensor 41 are provided for determining engine operating conditions. A fuel pressure sensor 42 is provided in the passage 36.

Output signals from sensors 40, 41 and 42 are supplied to a control unit 45 which feeds an ignition signal and a fuel injection pulse signal to the spark plug 9 and the injector 10, respectively.

Figure 2A:
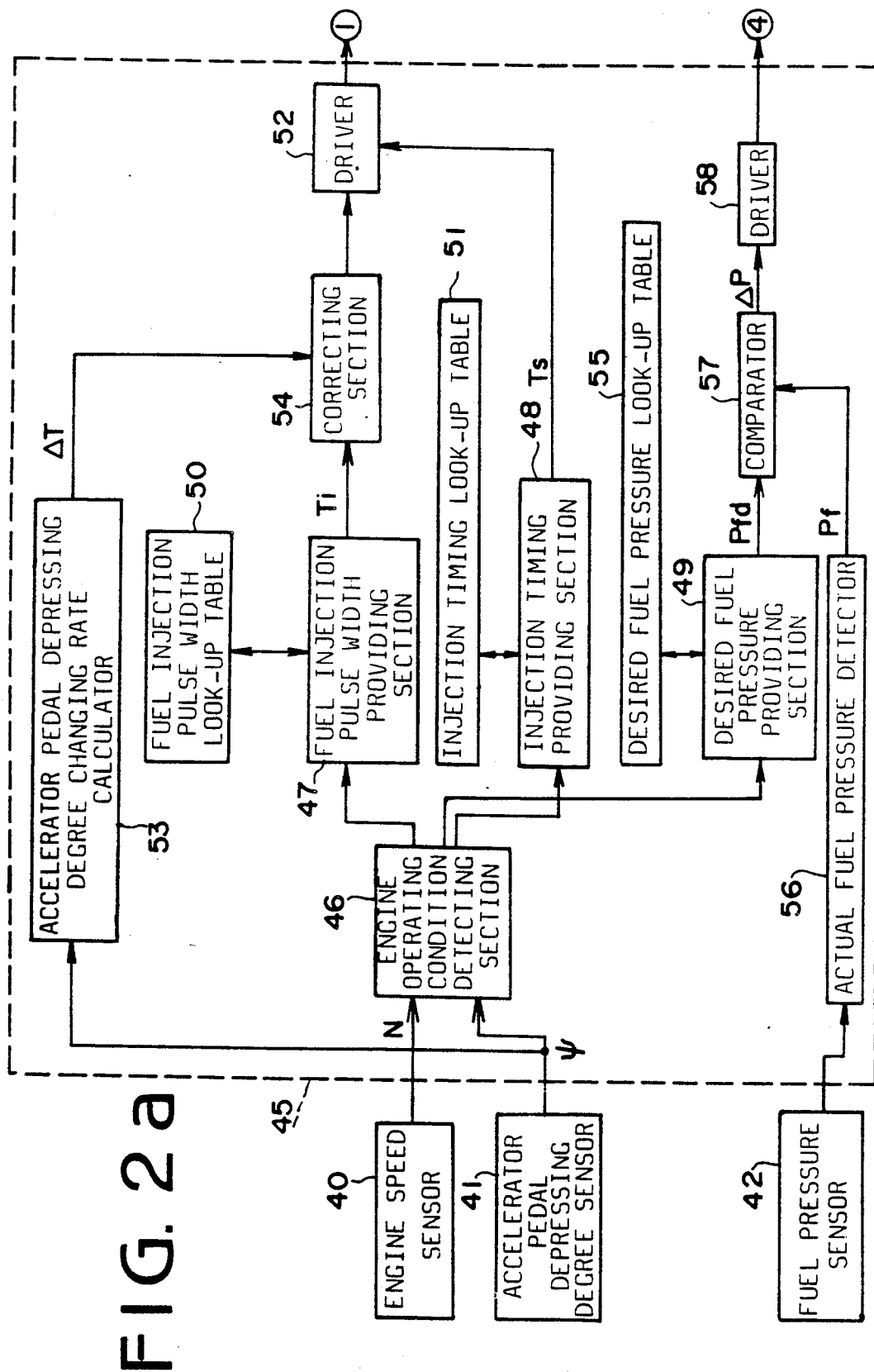

Referring to FIGS. 2a and 2b, the control unit 45 comprises an engine operating condition detecting section 46 to which engine speed N and accelerator pedal depressing degree $\psi$ are applied from the engine speed sensor 40 and the accelerator pedal depressing degree sensor 41. An output signal of the detecting section 46 is fed to a fuel injection pulse width providing section 47. The injection pulse width providing section 47 derives a fuel injection pulse width Ti from a fuel injection width look-up table 50 where a plurality of fuel injection pulse widths are stored. The fuel injection width Ti is determined as an increasing function of the engine load represented by the accelerator pedal opening degree $\psi$ when the engine speed N is constant as shown in FIG. 3a.

Figure 3C:
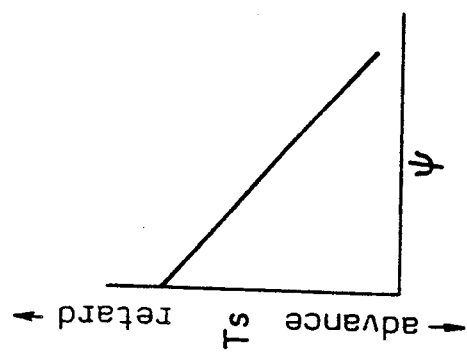
FIG. 3c is a graph showing starting timing of fuel injection with respect to accelerator pedal depressing degree.

The output signal of the engine operating condition detecting section 46 is further fed to an injection timing providing section 48 where starting timing Ts for injecting fuel is derived from an ignition timing look-up table 51. The fuel is injected in a range c between the closing of the exhaust port 11 and the time of ignition (ignition timing) as shown in FIG. 3b so as to prevent the fuel from escaping from the exhaust port 11. As shown in FIG. 3c, the injection timing Ts is advanced with increase of engine load, that is, with increase of the depressing degree $\psi$9 of the accelerator pedal.

The output signal of the injection timing providing section 48 and the output signal of the fuel injection pulse width providing section 47 which is corrected at a correcting section 54 are fed to a driver 52 which feeds a fuel injection pulse signal to the injector 10 thereby injecting fuel at the proper timing.

On the other hand, in a transient state such as during acceleration of the vehicle, the control of the pressure of the fuel is apt to be delayed so that the control unit 45 is provided with a system for increasing the fuel injection pulse width Ti. A correcting quantity providing section 53 is a with the accelerator pedal depressing degree $\psi$, where the changing rate $d\psi/dt$ of the accelerator pedal depressing degree is calculated to, detect acceleration. A correcting quantity $\Delta T$ is provided in accordance with the accelerator pedal depressing degree changing rate $d\psi/dt$ and applied to the correcting section 54 where the fuel injection pulse width Ti is corrected by adding the correcting quantity $\Delta T$, namely Ti+$\Delta T$ for a predetermined period, thereby increasing the amount of the fuel injected.

Figure 3D:
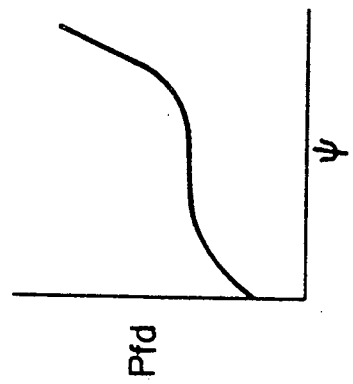
FIG. 3d is a graph showing fuel pressure with respect to accelerator pedal depressing degree.

The control unit 45 further has a desired fuel pressure providing section 49 which, in response to the output signal from the section 46 derives a desired fuel pressure Pfd from a desired fuel pressure look-up table 55. The desired fuel pressure look-up table stores a plurality of desired fuel pressures Pfd in accordance with the accelerator pedal depressing degree $\psi$ as shown in FIG. 3d. On the other hand, the fuel pressure signal of the fuel pressure sensor 42 is fed to an actual fuel pressure detector 56 to detect the actual fuel pressure Pf. The desired and actual fuel pressures are applied to a comparator 57 where the difference $\Delta P$ thereof is calculated. The difference $\Delta P$ is fed to a driver 58 which applies a duty ratio signal corresponding to the difference $\Delta P$ to the pressure regulating solenoid-operated valve 34.

The operation of the two-cycle engine is described hereinafter.

The air supplied from the scavenge pump 20 and cooled at the intercooler 19 is returned to the inlet side of the scavenge pump 20 through the bypass 23. Since the opening degree $\theta$ of the control valve 23 is controlled to be inversely proportional to the depressing degree $\psi$ of the accelerator pedal 26, when the depressing degree $\psi$ of the accelerator/pedal is small, the control valve 23 is opened a lot. As a result, a large amount of air is returned to the inlet side of the scavenge pump 20. Thus, a small amount of air, which corresponds to the small accelerator pedal depressing degree, flows into the cylinder 2 for scavenging without causing pumping loss. As the depressing degree $\psi$ increases, the quantity of fresh air forced into the cylinder 2 increases with the closing of the control valve 23.

When the piston 3 reaches a position close to the bottom dead center as shown in FIG. 1, the scavenge port 16 opens as well as the exhaust port 11 so that intake air, the quantity of which depends on the position of the accelerator pedal 26, is delivered by the scavenge pump 20 into the cylinder 2 through the intercooler 19 and the scavenge port 16. Consequently, burned gas in the cylinder 2 is scavenged so that fresh intake air is admitted therein in a short time. During the compression stroke, the piston 3 rises, closing both ports 11 and 16. The fuel is injected from the injector 10 in accordance with the fuel injection pulse signal from the control unit 45 at a high pressure to form a combustible mixture in the chamber 8. The mixture is swirled in the combustion chamber with the scavenging air and ignited by the spark plug 9 immediately before the top dead center. After the explosion, the piston 3 descends for a power stroke. Accordingly, the exhaust port 11 is opened so that high pressurized burned gas in the cylinder 2 escapes The piston 3 further descends, thereby returning to the afore-described intake stroke where the cylinder 2 is scavenged.

Meanwhile, the high pressure pump 33 of the fuel injection system 30 is driven by the motor 38 or the crankshaft 5 to inject the fuel at a high pressure. In the control unit 45, the engine speed N and the accelerator pedal depressing degree $\psi$ detected by the sensors 40 and 41, respectively, are fed to the engine operating condition detecting section 46 to detect the engine operating conditions. The duty ratio signal dependent on the difference $\Delta P$ between the desired fuel pressure Pfd derived from the desired fuel pressure look-up table 55 and the actual fuel pressure Pf detected by the fuel pressure sensor 42 is fed to the solenoid operated valve 34. Therefore, the quantity of fuel returning to, the fuel tank 31 is controlled, and hence fuel is injected from the injector 10 at the desired fuel pressure Pfd in accordance with the engine operating conditions.

In an engine operating condition where the engine load is very light, such as at idling, the desired fuel pressure is set at a low value such as 30 to 40 Kg/cm$^2$ in accordance with the graph shown in FIG. 3d, and a small fuel injection pulse width Ti is determined at the fuel injection pulse width providing section 47 as shown in FIG. 3a, in accordance with the small quantity of the fresh air induced into the combustion chamber 8. The fuel ignition timing Ts is retarded as much as possible in dependency on the graph of FIG. 3c. The fuel injection pulse signal corresponding to the fuel injection pulse width Ti and the injection timing Ts are applied to the injector 10. Thus, a small quantity of fuel is injected immediately before the ignition as shown in FIG. 4a, so that a rich fuel mixture stays in an upper portion of the cylinder without mixing with vertically swirling air because of low penetration of the fuel spray. Consequently, stratified charging is achieved so that the fuel in the upper portion of the cylinder 2 is ignited with the spark plug 9 without misfiring.

In a light engine load range, the fuel pressure increases up to 70 to 80 Kg/cm$^2$ and the fuel injection pulse width becomes larger as shown in FIG. 4b. The fuel injection is retarded so as to achieve the stratified charging as in the above-described engine load range (FIG. 4a).

As shown in FIG. 4c, in a middle engine load range, the fuel injection timing is advanced and the fuel injection pulse width is increased. Since the fuel injection starts during the early stage of the compression stroke, the air-fuel mixture is partly stratified as a result of the low penetration of the spray.

In a heavy engine load range the fuel pressure is further increased to 100 to 150 Kg/cm$^2$. As shown in FIG. 4d, a large quantity of fuel is injected in accordance with the large injection pulse width, starting immediately after closing the exhaust port, so as to prevent the fuel from escaping out of the exhaust port. Since the fuel is injected while the pressure in the cylinder 2 is still low, the fuel is widely distributed as a result of a sufficient penetration of the fuel spray. The fuel is further mixed with air during the compression stroke to produce a homogeneous mixture. Consequently, the combustible mixture is properly burned, effectively using a large quantity of air to generate large engine power.

When the vehicle is accelerated, the fuel injection pulse width Ti is quickly increased at the correcting section 54. Consequently, although the increase of the fuel pressure is delayed, the quantity of the injected fuel is increased immediately after the acceleration. When the fuel pressure is increased, the fuel injection pulse width Ti is determined as hereinbefore described.

When the engine speed N changes, the fuel injection timing changes but not the fuel injection pulse width.

The present invention may be modified to employ other factors besides engine speed N and the accelerator pedal depressing degree $\psi$. The speed of the motor 38 for driving the fuel pump 33 may be further changed for controlling the fuel pressure.

From the foregoing, it will be understood that the present invention provides a fuel injection control system for a two-cycle engine where the fuel pressure, fuel injection timing and duration of the fuel injection are properly and accurately controlled in accordance with engine operating conditions. Therefore, combustion efficiency is improved at any engine operating condition so as to improve fuel consumption and to increase engine power. Since only the fuel is directly injected to the combustion chamber, the fuel injection system and the control thereof are simplified. The stratified charging is achieved in the light engine load range so that the driveability as well as the combustion stability is improved. In the heavy engine load range, a homogeneous air fuel mixture is obtained, thereby increasing the engine power. In addition, the fuel pressure is accurately and quickly controlled with the feedback control system. Moreover, during acceleration, the fuel injection pulse width is increased thereby improving the response in a transient state.

While the presently preferred embodiments of the present invention have been shown and described, it is to be understood that these embodiments are for the purpose of illustration and that various changes and modifications may be made without departing from the scope of the invention as set forth in the appended claims.

What is claimed is:

1. In a fuel injection control system of a two cycle engine having an intake passage for inducing air into a cylinder of the engine, a fuel injector disposed on said cylinder for injecting an amount of fuel pressurized by a high pressure pump, a scavenge pump driven by said engine and disposed in an intake pipe connected to said cylinder, a control valve disposed in a bypass provided around the scavenge pump communicating with said cylinder for controlling power of said engine, an engine speed sensor for detecting engine speed and for producing a corresponding engine speed signal, an accelerator pedal sensor for detecting depressing degree of an accelerator pedal operatively connected with the control valve and for producing a corresponding degree signal, and a fuel pressure sensor for detecting pressure of said fuel fed to the fuel injector and for producing a corresponding pressure signal, the improvement of the system which comprises:

detecting means responsive to said degree signal and said engine speed signal for determining engine load and for generating a corresponding engine load signal;

a detector responsive to said pressure signal for detecting actual fuel pressure of said fuel fed to the fuel injector and for producing a corresponding actual fuel pressure signal;

fuel injector pulse width setting means responsive to said engine load signal for providing a fuel injection pulse width and for producing a corresponding fuel injection pulse width signal;

a calculator responsive to said degree signal for calculating a correcting quantity of said fuel in dependency on a changing rate of said depressing degree indicating acceleration and for producing a corresponding correcting quantity signal; and correcting means responsive to said correcting quantity signal and said fuel injection pulse width signal for operatively correcting the fuel injection pulse width and for producing a corresponding correcting signal so as to operatively increase the fuel injection pulse width with acceleration;

injection timing setting means responsive to said load signal for calculating injection timing of said fuel and for generating a corresponding injection timing signal which advances with increasing engine load;

first driving means responsive to said correcting signal and said injection timing signal for injecting said amount of fuel, said amount increasing with increasing said engine load by the advancing of said injection timing;

fuel pressure setting means responsive to said load signal for calculating a desired fuel pressure and for generating a corresponding desired fuel pressure signal;

a comparator responsive to said desired fuel pressure signal and said actual fuel pressure signal for deriving the difference between said desired and said actual fuel pressure and for producing a corresponding difference signal; and second driving means responsive to said difference signal for controlling said pressure of said fuel fed to the fuel injector as an increasing function of said engine load, whereby said engine is accurately controlled at any operating condition, by stratified charging at light engine load conditions, and by homogeneously inducing air fuel mixture into said cylinder at heavy load conditions.

2. The system according to claim 1, wherein
said fuel injection pulse width setting means increases the fuel injection pulse width in proportion to said engine load when the engine speed is constant.

3. The system according to claim 1, wherein
the fuel injection pulse width setting means comprises
a fuel injection pulse width look-up table, and
a fuel injection pulse width providing section for deriving the fuel injection pulse width from the fuel injection pulse width look-up table in accordance with said engine load signal.

4. The system according to claim 1, wherein
the fuel pressure setting means comprises
a desired fuel pressure look-up table,
a desired fuel pressure providing section for deriving the desired fuel pressure from the desired fuel pressure look-up table in accordance with said engine load signal, and wherein
said second driving means is for operating a solenoid operated valve in a fuel passage to said fuel injector in accordance with the difference.

* * * * *